(12) United States Patent
Wang

(10) Patent No.: US 12,261,515 B2
(45) Date of Patent: Mar. 25, 2025

(54) CIRCUIT CONTROL METHOD AND APPARATUS

(71) Applicant: Ace Power and Technology Co., Ltd, Shanghai (CN)

(72) Inventor: Yuetian Wang, Shanghai (CN)

(73) Assignee: Ace Power and Technology Co., Ltd, Shanghai (CN)

( * ) Notice: Subject to any disclaimer, the term of this patent is extended or adjusted under 35 U.S.C. 154(b) by 0 days.

(21) Appl. No.: 17/933,773

(22) Filed: Sep. 20, 2022

(65) Prior Publication Data
US 2023/0208273 A1     Jun. 29, 2023

(30) Foreign Application Priority Data
Dec. 29, 2021 (CN) .......................... 202111640325.2

(51) Int. Cl.
*H02M 1/00* (2007.01)
*H02M 3/335* (2006.01)
(52) U.S. Cl.
CPC ....... *H02M 1/0058* (2021.05); *H02M 1/0095* (2021.05); *H02M 3/33571* (2021.05); *H02M 3/33576* (2013.01)
(58) Field of Classification Search
CPC ............. H02M 1/0058; H02M 1/0095; H02M 3/33571; H02M 3/33576
See application file for complete search history.

(56) References Cited

U.S. PATENT DOCUMENTS

| | | | |
|---|---|---|---|
| 5,631,814 | A | 5/1997 | Zak |
| 10,298,023 | B2 | 5/2019 | Liao et al. |
| 11,005,378 | B2 | 5/2021 | Medina-Garcia |
| 11,018,592 | B2 | 5/2021 | Ausseresse et al. |
| 2008/0174276 | A1 | 7/2008 | Takahashi et al. |

(Continued)

FOREIGN PATENT DOCUMENTS

| | | |
|---|---|---|
| CN | 103178703 A | 6/2013 |
| CN | 103227566 A | 7/2013 |

(Continued)

OTHER PUBLICATIONS

Extended European Search Report for European Application No. 22195986.9, Dated: May 24, 2023, 8 pages.

(Continued)

*Primary Examiner* — Gary A Nash
(74) *Attorney, Agent, or Firm* — Hamilton, Brook, Smith & Reynolds, P.C.

(57) ABSTRACT

The present disclosure provides a circuit control method and a circuit control apparatus, which are applied to a hybrid flyback circuit. The method includes: determining an acquisition time point according to a turn-on alternating duration of a first MOS switch and a second MOS switch on a main side of the hybrid flyback circuit and a preset time coefficient; acquiring a midpoint voltage between the first MOS switch and the second MOS switch according to the acquisition time point to obtain a first voltage signal; and adjusting negative excitation current in the hybrid flyback circuit according to a comparison result of the first voltage signal and a preset voltage value, so that the negative excitation current meets zero voltage switching of a primary-side switch of the hybrid flyback circuit.

10 Claims, 5 Drawing Sheets

(56) References Cited

U.S. PATENT DOCUMENTS

| | | |
|---|---|---|
| 2009/0236916 A1 | 9/2009 | Nishimura |
| 2011/0090717 A1 | 4/2011 | Lee et al. |
| 2013/0099720 A1 | 4/2013 | Chuah et al. |
| 2013/0162048 A1 | 6/2013 | Kim et al. |
| 2013/0332642 A1 | 12/2013 | Capezza |
| 2014/0312862 A1 | 10/2014 | Xie et al. |
| 2015/0162782 A1 | 6/2015 | Kanakasabai et al. |
| 2015/0180350 A1 | 6/2015 | Huang et al. |
| 2016/0034333 A1 | 2/2016 | Ozawa et al. |
| 2016/0225559 A1 | 8/2016 | Ueki |
| 2016/0329811 A1 | 11/2016 | Du et al. |
| 2017/0237332 A1* | 8/2017 | Takahashi ............ H02M 1/083 323/235 |
| 2018/0067885 A1 | 3/2018 | Hsieh et al. |
| 2018/0294734 A1* | 10/2018 | Song ................ H02M 3/33592 |
| 2018/0302005 A1 | 10/2018 | Cui et al. |
| 2018/0367042 A1* | 12/2018 | Andersen ................ H02M 1/36 |
| 2019/0033953 A1 | 1/2019 | Kadgi et al. |
| 2019/0036442 A1* | 1/2019 | Oh .................... H02M 3/33592 |
| 2019/0044372 A1 | 2/2019 | Cochran |
| 2020/0142463 A1 | 5/2020 | Hand et al. |
| 2021/0193366 A1 | 6/2021 | Wang et al. |
| 2021/0203168 A1 | 7/2021 | Sharma et al. |
| 2021/0344211 A1 | 11/2021 | Yu et al. |
| 2022/0107675 A1 | 4/2022 | Kim et al. |
| 2022/0404891 A1 | 12/2022 | Wang et al. |
| 2023/0068669 A1 | 3/2023 | Hanaoka et al. |
| 2023/0205288 A1 | 6/2023 | Wang |
| 2024/0305103 A1 | 9/2024 | Wang |
| 2024/0339941 A1 | 10/2024 | Wang |
| 2024/0348170 A1 | 10/2024 | Wang |

FOREIGN PATENT DOCUMENTS

| | | | |
|---|---|---|---|
| CN | 106329890 A | | 1/2017 |
| CN | 108933515 A | | 12/2018 |
| CN | 110138223 A | | 8/2019 |
| CN | 110289766 A | | 9/2019 |
| CN | 110719029 A | | 1/2020 |
| CN | 110719046 A | | 1/2020 |
| CN | 111404393 A | | 7/2020 |
| CN | 111446858 A | | 7/2020 |
| CN | 111541257 A | | 8/2020 |
| CN | 111600499 A | | 8/2020 |
| CN | 211957378 U | | 11/2020 |
| CN | 112067886 A | * 12/2020 | ............ G01R 15/183 |
| CN | 112072924 A | | 12/2020 |
| CN | 112803800 A | | 5/2021 |
| CN | 113346756 A | | 9/2021 |
| CN | 113364295 A | | 9/2021 |
| CN | 113428028 A | | 9/2021 |
| CN | 113760072 A | | 12/2021 |
| CN | 216414195 U | | 4/2022 |
| CN | 216599026 U | | 5/2022 |
| EP | 3726722 A1 | | 10/2020 |
| TW | 201838303 A | * 10/2018 | ............ H02M 1/083 |
| WO | 2014/132452 A1 | | 9/2014 |
| WO | 2015/027693 A1 | | 3/2015 |
| WO | 2021/128778 A1 | | 7/2021 |
| WO | 2023/098016 A1 | | 6/2023 |
| WO | 2023/098146 A1 | | 6/2023 |
| WO | 2023/098193 A1 | | 6/2023 |

OTHER PUBLICATIONS

Medina-Garcia, A. et al., "Resonant Hybrid Flyback, a New Topology for High Density Power Adaptors," Electronics, 7 (12), 363, 12 pages (2018).

"Inverter Power Technology in New Energy Power Generation," Non-dispatchable grid-connected PV system, 83 pages (With English Abstract).

Hongtao et al., "Input-parallel-output-parallel Wide-range Bidirectional Isolated DC/DC Converter," Journal of Power Supply, vol. 18, No. 3, pp. 13-20 (2020).

U.S. Appl. No. 18/579,308, entitled "Direct Current to Direct Current (DCDC) Converter and Control Method," filed on Jan. 12, 2024.

U.S. Appl. No. 18/579,327, entitled "Three-Level Control Circuit, Power Conversion Device, and Control Method Thereof," filed on Jan. 12, 2024.

* cited by examiner

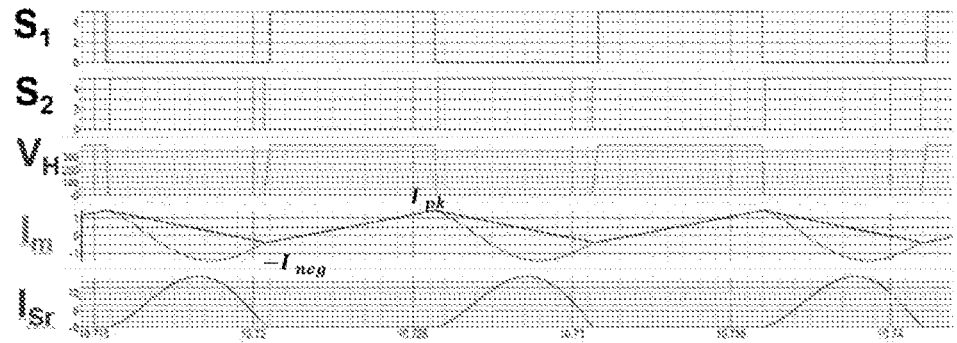

FIG. 3

Determining an acquisition time point according to a turn-on alternating duration of a first MOS switch and a second MOS switch on a main side of the hybrid flyback circuit and a preset time coefficient ⟶ S401

Acquiring a midpoint voltage between the first MOS switch and the second MOS switch according to the acquisition time point to obtain a first voltage signal ⟶ S402

Adjusting negative excitation current according to a comparison result of the first voltage signal and a preset voltage value, so that the negative excitation current meets zero voltage switching of a primary-side switch of the hybrid flyback circuit ⟶ S403

FIG. 4 generating a second voltage signal through a feedback compensation network circuit according to the comparison result — S501 adjusting the negative excitation current by adjusting a turn-on duration of the second MOS switch according to the second voltage signal — S502

FIG. 5 adjusting the turn-on duration of the second MOS switch according to the second voltage signal, and recording the turn-on duration of the second MOS switch to generate a third voltage signal — S601 turning off the second MOS switch according to a comparison result of the second voltage signal and the third voltage signal — S602

FIG. 6

CIRCUIT CONTROL METHOD AND APPARATUS

RELATED APPLICATION

This application claims priority under 35 U.S.C. § 119 or 365 to Chinese Application Number 202111640325.2, filed on Dec. 29, 2021, the subject matter of which is incorporated herein by reference in its entirety.

FIELD

The present disclosure relates to the technical field of digital circuits, and particularly to a circuit control method and apparatus.

BACKGROUND

In 2021, with the release of the USB PD 3.1, the power range supported by the USB PD extended from 100 W to 240 W, so that the application range of the USB PD extended from the original communication devices (smart phones, tablets and laptops) to devices such as power tools, electric bicycles and industrial robots. The method adopted by the USB PD 3.1 to increase the power is to boost the output voltage rather than the output current. Compared with the USB PD 3.0 released in 2015, the range of the output voltage is extended from 5 V~20 V to 5 V~48 V, and the maximum output current is 5 A. The Hybrid Flyback topology, as illustrated in FIG. 1, is very suitable for the application scenarios of the USB PD 3.1: on the one hand, the output voltage can be adjusted conveniently by adjusting the duty cycle; and on the other hand, there is a property similar to the LLC topology as illustrated in FIG. 2, which can realize the Zero Voltage switching (ZVS) of the primary-side switch tube and the Zero Current switching (ZCS) of the secondary-side synchronous rectifier tube. In addition, the topology mechanism is also very simple, with two switch tubes at the primary side and one synchronous rectifier tube at the secondary side. The key to realize a high efficiency by the Hybrid Flyback topology is to ensure the Zero Voltage switching (ZVS) of the primary-side switch tube, and the key to realize the Zero Voltage switching (ZVS) is to ensure that a value of negative excitation current $I_{val}$ (as illustrated in FIG. 3) in the hybrid flyback circuit meets the following condition:

$$I_{val} \geq \frac{V_{bus}}{\sqrt{L_m/(C_{oss1}+C_{oss2})}}$$

wherein $L_m$ denotes an excitation inductance value of a transformer, $C_{oss1}$ and $C_{oss2}$ denote parasitic capacitances of the primary-side switch tubes, respectively; and $v_{bus}$ denotes an output voltage of a PFC stage, i.e., a bus voltage.

However, the value of the negative excitation current is not the larger the better, because when the negative excitation current is excessive, although the Zero Voltage switching (ZVS) of the primary-side switch tube is ensured, an additional conduction loss and a transformer core loss will be caused, resulting in a decrease of the efficiency. Thus, at present, the control method of the negative excitation current includes: when S1 is turned on, detecting whether the ZVS is achieved by S1, 1) if the ZVS is not achieved by S1, increasing a turned-on duration of S2 in a next cycle by Δt to increase the negative excitation current, so that S1 can achieve the ZVS after one or more switch cycles; and 2) if the ZVS is achieved by S1, decreasing a turned-on duration of S2 in a next cycle by Δt to decrease the negative excitation current, so that S1 will lose the ZVS condition again after one or more switch cycles. The system repeats the above two steps, and finally the negative excitation current can be controlled to the vicinity of an optimization point.

SUMMARY

The present disclosure provides a circuit control method and apparatus, which can accurately control a target quantity to a desired set value through a feedback control, thereby realizing a precise control of an optimization point and optimizing an efficiency.

The circuit control method provided by the present disclosure is applied to a hybrid flyback circuit, including: determining an acquisition time point according to an on-off alternating duration of a first MOS switch and a second MOS switch on a primary side of the hybrid flyback circuit and a preset time coefficient; acquiring a midpoint voltage between the first MOS switch and the second MOS switch according to the acquisition time point to obtain a first voltage signal; and adjusting negative excitation current in the hybrid flyback circuit according to a comparison result of the first voltage signal and a preset voltage value, the negative excitation current meeting zero voltage switching of a primary-side switch of the hybrid flyback circuit.

In some embodiments of the present disclosure, optionally, determining an acquisition time point according to a turn-on alternating duration of a first MOS switch and a second MOS switch on a main side of the hybrid flyback circuit and a preset time coefficient includes: obtaining dead time according to turn-off end time of the second MOS switch and turn-on start time of the first MOS switch; and determining the acquisition time point according to the preset time coefficient and the dead time.

In some embodiments of the present disclosure, optionally, adjusting negative excitation current according to a comparison result of the first voltage signal and a preset voltage value includes: generating a second voltage signal by using a feedback compensation network circuit according to the comparison result of the voltage signal and the preset voltage value; and adjusting the negative excitation current by adjusting a turn-on duration of the second MOS switch according to the second voltage signal.

In some embodiments of the present disclosure, optionally, adjusting the negative excitation current by adjusting a turn-on duration of the second MOS switch according to the second voltage signal includes: adjusting the turn-on duration of the second MOS switch according to the second voltage signal, and recording the turn-on duration of the second MOS switch to generate a third voltage signal; and turning off the second MOS switch according to a comparison result of the second voltage signal and the third voltage signal.

In some embodiments of the present disclosure, optionally, adjusting the turn-on duration of the second MOS switch according to the second voltage signal includes: increasing the turn-on duration of the second MOS switch according to a preset rule, when the first voltage signal is higher than the preset voltage value; and decreasing the turn-on duration of the second MOS switch according to the preset rule, when the first voltage signal is lower than the preset voltage value.

In some embodiments of the present disclosure, optionally, acquiring a midpoint voltage between the first MOS switch and the second MOS switch according to the acquisition time point to obtain a first voltage signal includes: acquiring an equivalent voltage of the midpoint voltage between the first MOS switch and the second MOS switch by using an auxiliary winding of a transformer of the hybrid flyback circuit according to the acquisition time point, to obtain the first voltage signal.

The present disclosure further provides a circuit control apparatus applied to a hybrid flyback circuit, including: a calculation module configured to determine an acquisition time point according to a turn-on alternating duration of a first MOS switch and a second MOS switch on a main side of the hybrid flyback circuit and a preset time coefficient; and a feedback compensation network module configured to acquire a midpoint voltage between the first MOS switch and the second MOS switch according to the acquisition time point to obtain a first voltage signal, and adjust negative excitation current according to a comparison result of the first voltage signal and a preset voltage value, so that the negative excitation current meets zero voltage switching of a primary-side switch of the hybrid flyback circuit.

In some embodiments of the present disclosure, optionally, the feedback compensation network module includes: a sampling unit configured to acquire the midpoint voltage between the first MOS switch and the second MOS switch according to the acquisition time point to obtain the first voltage signal; a feedback compensation unit configured to generate a second voltage signal according to the comparison result of the voltage signal and the preset voltage value; and an adjustment unit configured to adjust a turn-on duration of the second MOS switch according to the second voltage signal.

In some embodiments of the present disclosure, optionally, the adjustment unit includes: a turn-on timer configured to record the turn-on duration of the second MOS switch to generate a third voltage signal; and a comparator configured to turn off the second MOS switch according to a comparison result of the second voltage signal and the third voltage signal.

In some embodiments of the present disclosure, optionally, the sampling unit is configured to acquire an equivalent voltage of the midpoint voltage between the first MOS switch and the second MOS switch through an auxiliary winding of a transformer of the hybrid flyback circuit to obtain the first voltage signal.

The present disclosure sets the magnitude of the negative excitation current by adjusting the preset voltage value and the preset time coefficient, thereby optimizing the efficiency, and the stability of the set value of the negative excitation current under the dynamic load can be ensured by setting the frequency response characteristic of the compensation network. The quasi-zero voltage switching (Quasi-ZVS) can be realized, that is, when the first MOS switch is turned on, the voltage value of the midpoint voltage is a value close to 0. Meanwhile, the negative excitation current is decreased, and the on-state loss and the transformer core loss are reduced, thereby obtaining a better comprehensive efficiency.

In order that the above and other objectives, features and advantages of the present disclosure are more obvious and understandable, the following embodiments will be described in detail with reference to the accompanied drawings.

BRIEF DESCRIPTION OF THE DRAWINGS

In order to more clearly describe the technical solutions in the embodiments of the present disclosure, the drawings to be used in the description of the embodiments will be briefly introduced as follows. Obviously, the following drawings are not necessarily to scale, only illustrate some embodiments of the present disclosure, and those of ordinary skill in the art can obtain any other drawing from them without paying any creative effort. In drawings:

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 illustrates a relationship diagram between negative excitation current and zero voltage switching;

FIG. 4 illustrates a flow diagram of a circuit control method according to an embodiment of the present disclosure;

FIG. 5 illustrates a flow diagram of an adjustment of negative excitation current according to an embodiment of the present disclosure;

FIG. 6 illustrates a flow diagram of an adjustment of a turned-on duration of a second MOS switch according to an embodiment of the present disclosure;

DETAILED DESCRIPTION

Figure 1:
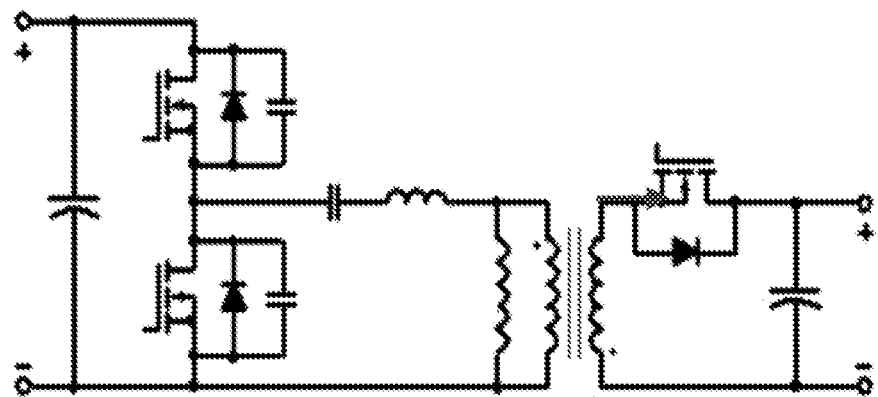
FIG. 1 illustrates a structural diagram of a conventional hybrid flyback topology.
Figure 2:
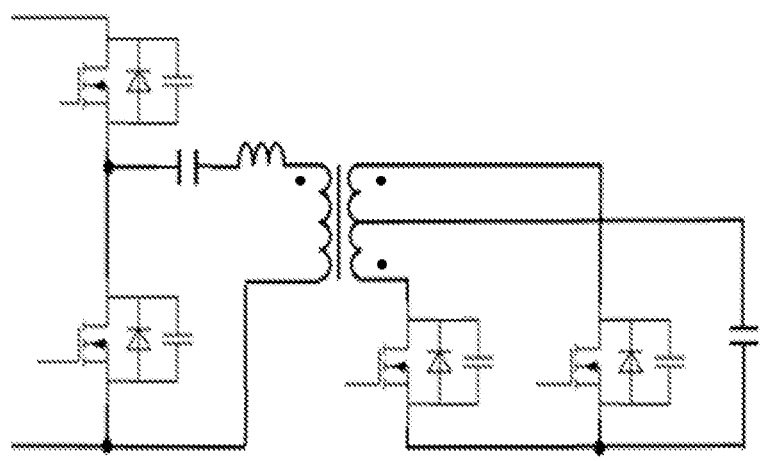
FIG. 2 illustrates a structural diagram of a conventional LLC topology.

A description of example embodiments follows.

The technical solutions in the embodiments of the present disclosure will be clearly and completely described below with reference to the drawings in the embodiments of the present disclosure. Obviously, those described are only a part, rather than all, of the embodiments of the present disclosure. Based on the embodiments of the present disclosure, any other embodiment obtained by those of ordinary skills in the art without paying any creative effort should fall within the protection scope of the present disclosure.

With reference to the following description and drawings, the specific embodiments of the present disclosure are disclosed in detail, and the ways in which the principle of the present disclosure can be adopted are pointed out. It should be understood that the scope of the embodiments of the present disclosure are not limited thereto. Within the scope of the spirit and provisions of the appended claims, the embodiments of the present disclosure include many changes, modifications and equivalents.

The features described and/or illustrated for one embodiment can be used in one or more other embodiments in the same or similar way, or combined with or substituted for features in other embodiments.

It should be emphasized that the term 'comprise/include' used herein refers to the presence of features, integers, steps or components, without excluding the presence or addition of one or more other features, integers, steps or components.

Referring to FIG. 4, a circuit control method provided in the present disclosure is applied to a hybrid flyback circuit, and the method includes:

S401: determining an acquisition time point according to a turn-on alternating duration of a first MOS switch and a second MOS switch on a main side of the hybrid flyback circuit and a preset time coefficient;

S402: acquiring a midpoint voltage between the first MOS switch and the second MOS switch according to the acquisition time point to obtain a first voltage signal;

S403: adjusting negative excitation current according to a comparison result of the first voltage signal and a preset voltage value, so that the negative excitation current meets zero voltage switching of a primary-side switch of the hybrid flyback circuit.

In some embodiments of the present disclosure, optionally, determining an acquisition time point according to a turn-on alternating duration of a first MOS switch and a second MOS switch on a main side of the hybrid flyback circuit and a preset time coefficient includes: obtaining dead time according to turn-off end time of the second MOS switch and turn-on start time of the first MOS switch; and determining the acquisition time point according to the preset time coefficient and the dead time.

Specifically, in actual works, a time period after a turn-off of the second MOS switch and before a turn-on of the first MOS switch is the dead time, i.e., the above alternating duration. Based on the dead time and the preset time coefficient, a specific time point can be located. For example, when the dead time is A and the preset time coefficient is 0.5, the acquisition time point may be 0.5 A. At this time, when A is 1 minute, the acquisition time point is the 30th second after the turn-off of the second MOS switch. Thereafter, the step S502 completes the acquisition of the midpoint voltage according to the time point.

In which, the preset time coefficient may be set by the staff according to the actual needs, and it is substantively a coefficient less than 1, for the purpose of determining a specific sampling time point in the dead time. In which, the sampling time point may be any time in the dead time, and it is not limited in the present disclosure.

After the first voltage signal is acquired based on the sampling time point, an adjustment scheme can be determined using the first voltage signal. Specifically, please refer to FIG. 5, in some embodiments of the present disclosure, adjusting negative excitation current according to a comparison result of the first voltage signal and a preset voltage value may include:

S501: generating a second voltage signal through a feedback compensation network circuit according to the comparison result;

S502: adjusting the negative excitation current by adjusting a turn-on duration of the second MOS switch according to the second voltage signal.

In which, adjusting a turn-on duration of the second MOS switch according to the second voltage signal may include: increasing the turn-on duration of the second MOS switch according to a preset rule, when the first voltage signal is higher than the preset voltage value; and decreasing the turn-on duration of the second MOS switch according to the preset rule, when the first voltage signal is lower than the preset voltage value. In this embodiment, the principle of adjusting the negative excitation current by means of the turn-on duration of the second MOS switch is: the negative excitation current increases as the turn-on duration of the second MOS switch increases, and finally, a drop rate of the midpoint voltage is accelerated, which decreases a voltage value of a midpoint voltage VH at the sampling time point; and the negative excitation current decreases as the turn-on duration of the second MOS switch decreases, and finally, the drop rate of the midpoint voltage is slowed down, which increases the voltage value of the midpoint voltage VH at the sampling time point. Specifically, in actual works, the preset rule can be established according to a corresponding relationship between the turn-on duration of the second MOS switch and the negative excitation current. For example, when the turn-on duration of the second MOS switch is A, the negative excitation current is increased by B, and every time the turn-on duration of the second MOS switch is increased by A1, the negative excitation current is increased by B1. At this time, when the first voltage signal is less than the preset voltage value, a difference C between the first voltage signal and the preset voltage value may be calculated, and according to a multiple relationship between C and B1, A is increased by a corresponding multiple of A1 to realize that the first voltage signal is close or equal to the preset voltage value. Similarly, it can also be analyzed that every time the turn-on duration of the second MOS switch is decreased by A2, the negative excitation current is decreased by B2, and when the first voltage signal is greater than the preset voltage value, A may be decreased by a corresponding multiple of A2 in a similar way. Therefore, the magnitude of the negative excitation current can be set by adjusting the preset voltage value and the preset time coefficient, thereby optimizing the overall working efficiency of the hybrid flyback circuit by means of the zero voltage switching.

Referring to FIG. 6 for the adjustment mode of the turn-on duration of the second MOS switch. In some embodiments of the present disclosure, adjusting the negative excitation current by adjusting a turn-on duration of the second MOS switch according to the second voltage signal may include:

S601: adjusting the turn-on duration of the second MOS switch according to the second voltage signal, and recording the turn-on duration of the second MOS switch to generate a third voltage signal;

S602: turning off the second MOS switch according to a comparison result of the second voltage signal and the third voltage signal.

Specifically, in actual works, the second voltage signal is used to set the turn-on duration of the second MOS switch, and the third voltage signal gradually increases along with the increase of the turn-on duration of the second MOS switch. When the second voltage signal and the third voltage signal are equal to each other, it means that the second MOS switch completes the set turn-on duration, and then the second MOS switch can be turned off.

To avoid the use of high-voltage sampling devices and reduce the cost, in some embodiments of the present disclosure, acquiring a midpoint voltage between the first MOS switch and the second MOS switch according to the acquisition time point to obtain a first voltage signal may include: acquiring a midpoint voltage between the first MOS switch and the second MOS switch through an auxiliary winding of a transformer of a hybrid flyback circuit according to the acquisition time point, to obtain the first voltage signal. For the detailed structure, please refer to the auxiliary winding structure of the transformer in the prior art, and the function is to avoid the use of high-voltage sampling devices by measuring the equivalent voltage. In view of the various structural forms, the examples will not be enumerated here.

Figure 7:
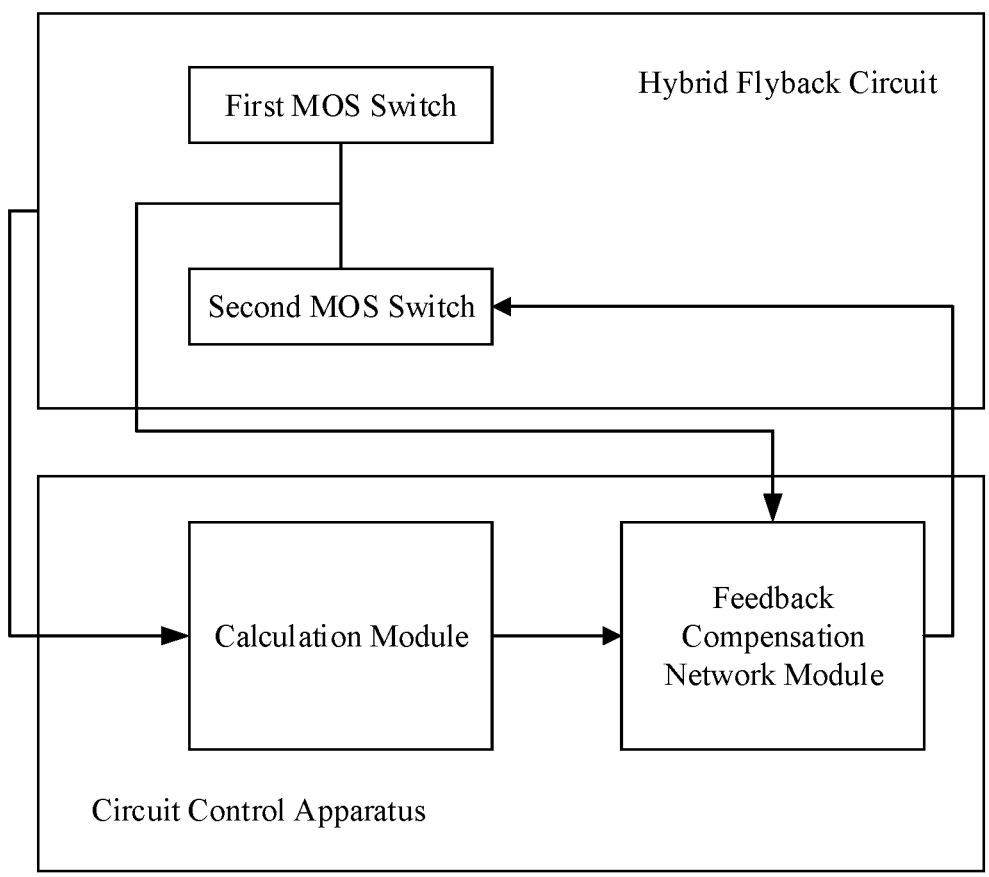
FIG. 7 illustrates a principle and structural diagram of a circuit control apparatus according to an embodiment of the present disclosure.

Referring to FIG. 7, the present disclosure further provides a circuit control apparatus applied to a hybrid flyback circuit, including: a calculation module configured to determine an acquisition time point according to a turn-on alternating duration of a first MOS switch and a second MOS switch on a main side of the hybrid flyback circuit and a preset time coefficient; and a feedback compensation network module configured to acquire a midpoint voltage between the first MOS switch and the second MOS switch according to the acquisition time point to obtain a first voltage signal, and adjust negative excitation current according to a comparison result of the first voltage signal and a preset voltage value, so that the negative excitation current meets zero voltage switching of a primary-side switch of the hybrid flyback circuit.

In the above embodiment, the feedback compensation network module includes: a sampling unit configured to acquire the midpoint voltage between the first MOS switch and the second MOS switch according to the acquisition time point to obtain the first voltage signal; a feedback compensation unit configured to generate a second voltage signal according to the comparison result of the voltage signal and the preset voltage value; and an adjustment unit configured to adjust a turn-on duration of the second MOS switch according to the second voltage signal. In which, the adjustment unit includes: a turn-on timer configured to record the turn-on duration of the second MOS switch to generate a third voltage signal; and a comparator configured to turn off the second MOS switch according to a comparison result of the second voltage signal and the third voltage signal. In actual works, the comparator and the turn-on timer may be electrically connected for a voltage signal transmission. It should be noted that the present disclosure does not define a direct connection between the comparator and the turn-on timer, and those skilled in the art can make a selection according to actual needs.

Figure 8:
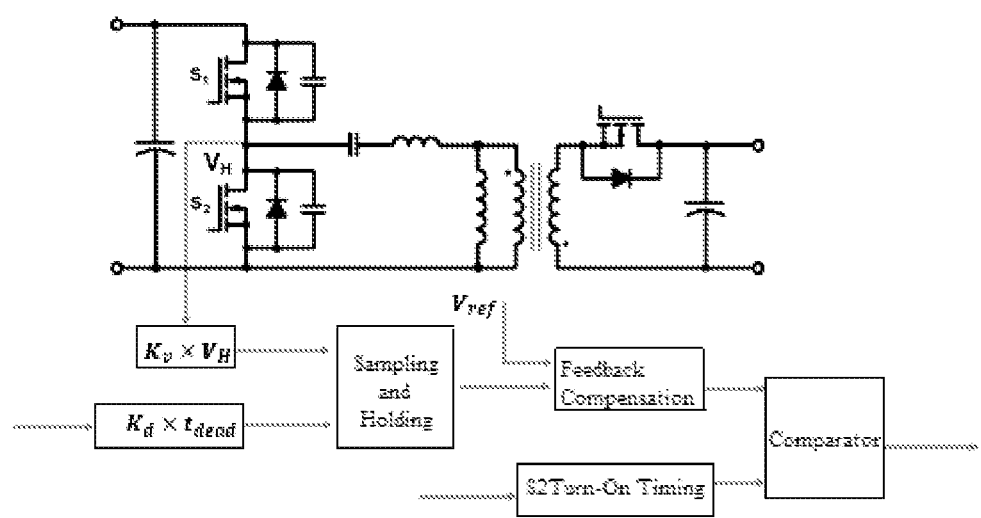
FIG. 8 illustrates an application logic diagram of a circuit control apparatus according to an embodiment of the present disclosure.

Please refer to FIG. 8 for a clearer understanding of the specific application mode and the principle of the circuit control apparatus provided in the present disclosure.

Before S1 is turned on, a sampling (Kv×VH) is carried out and a voltage signal of the midpoint voltage VH is held (sampling and holding S/H). This signal is input to a reverse input terminal of a feedback compensation network circuit, and a reference voltage Vref signal is connected to a forward input terminal of the feedback compensation network circuit. Through the feedback compensation network circuit, a voltage signal is formed to set the turn-on duration of S2. In addition, there is a turn-on timing unit of S2 configured to record the turn-on duration of S2 and form a voltage signal indicating the same. The voltage signal is input to a comparator for comparison together with the voltage signal for setting the turn-on duration of S2, and S2 is turned off when the voltage signal indicating the turn-on duration of S2 is equal to the voltage signal for setting the turn-on duration of S2. The principle is as follows: the voltage value of the midpoint voltage VH at a moment after S2 is turned off and before S1 is turned on (e.g., a moment Kd×tdead after S2 is turned off, wherein tdead is dead time after S2 is turned off and before S1 is turned on, and Kd is a coefficient less than 1) is sampled to determine whether the voltage value at the moment is equal to the set value Vref; if the sampled value at the moment is higher than the set value, then it sets, through the feedback network, that the voltage signal increases at a turn-on moment of S2, and the turn-on duration of S2 in the next cycle is correspondingly extended, thereby increasing the negative excitation current, and finally accelerating the drop rate of the midpoint voltage and reducing the voltage value of the midpoint voltage VH at a sampling moment; if the sampling value at the moment is lower than the set value, then it sets, through the feedback network, the voltage signal decreases at the turn-on moment of S2, and the turn-on duration of S2 in the next cycle is shortened, thereby decreasing the negative excitation current, and finally slowing down the drop rate of the midpoint voltage and increasing the voltage value of the midpoint voltage VH at the sampling time. Through the design of the feedback network, the sampled value can be accurately located at the set value. Since there is a time period between the sampling moment and the turn-on moment of S1, the zero voltage switching (ZVS) of S1 can be realized by reasonably setting a length of the time period (adjusting Kd) and the reference voltage Vref. The stability of the set value of the negative excitation current under the dynamic load can be ensured by setting the frequency response characteristic of the compensation network.

In practical applications, the circuit control method and apparatus provided in the present disclosure can further realize a quasi-zero voltage switching (Quasi-ZVS), that is, when S1 is turned on, the voltage value of the midpoint voltage VH may be not only equal to 0, but also a value close to 0. Although this causes a turn-on loss, the negative excitation current is decreased, and the on-state loss and the transformer core loss are reduced, thereby obtaining a better comprehensive efficiency.

The present disclosure has the following advantageous technical effects: the magnitude of the negative excitation current is set by adjusting the preset voltage value and the preset time coefficient, thereby optimizing the efficiency, and the stability of the set value of the negative excitation current under the dynamic load can be ensured by setting the frequency response characteristic of the compensation network. The quasi-zero voltage switching (Quasi-ZVS) can be realized, that is, when the first MOS switch is turned on, the voltage value of the midpoint voltage may be not only equal to 0, but also a value close to 0. Meanwhile, the negative excitation current is decreased, and the on-state loss and the transformer core loss are reduced, thereby obtaining a better comprehensive efficiency.

It should be noted that herein, the relational terms such as 'first' and 'second' are only used to distinguish one entity or operation from another entity or operation, and do not necessarily require or imply any such actual relationship or sequence between these entities or operations. In addition, the term 'comprise', 'include' or any other variation thereof is intended to cover non-exclusive inclusions, so that a process, method, article or device that includes a series of elements includes not only those elements, but also other elements not explicitly listed, or further includes elements inherent to such process, method, article or device. Without further restrictions, an element defined by a statement 'comprising a . . . ' does not exclude the existence of other identical elements in a process, method, article or device that includes said element. An orientation or positional relationship indicated by a term such as 'upper' or 'lower' is based on the drawings, only for the convenience of describing the present disclosure and simplifying the description, rather than indicating or implying that the referred device or element must have a specific orientation, or be constructed and operated in a specific orientation, and therefore should not be understood as a limitation to the present disclosure. Unless otherwise specified and limited explicitly, the terms 'installation', 'connected' and 'connection' should be understood broadly, e.g., it may be possible for a fixed connection, a detachable connection, an integrated connection, a mechanical connection, an electrical connection, a direct connection, an indirect connection through an intermediate medium, or a communication between the interiors of two elements. For those of ordinary skill in the art, the specific meanings of the above terms in the present disclosure can be understood according to specific situations.

The embodiments of the present disclosure are all described in a progressive manner, and the same or similar portions of the embodiments can refer to each other. Each embodiment lays an emphasis on its distinctions from other embodiments. In the description of the present disclosure, the description of reference terms 'one embodiment', 'some embodiments', 'an example', 'a specific example' or 'some examples' and the like mean that the specific features, structures, materials, or characteristics described in conjunction with the embodiment(s) or example(s) are included in at least one embodiment or example of the present disclosure. In the present disclosure, the schematic expressions of the above terms do not necessarily aim at the same embodiment or example. Moreover, the described specific features, structures, materials, or characteristics may be combined in any one or more embodiments or examples in a suitable manner. In addition, those skilled in the art can combine different embodiments or examples described in the present disclosure and features thereof if there is no contradiction to each other.

In the present disclosure, specific examples are applied to describe the principle and the implementations of the present disclosure, and the description thereof is only for the purpose of helping understanding of the method and the core concept of the present disclosure. Meanwhile, according to the concept of the present disclosure, those skilled in the art can change the specific implementations and the application scope. To sum up, the content of the present disclosure should not be construed as restrictions thereto.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit control method applied to a hybrid flyback circuit, comprising:
   determining an acquisition time point according to a turn-on alternating duration of a first MOS switch and a second MOS switch on a main side of the hybrid flyback circuit and a preset time coefficient;
   acquiring a midpoint voltage between the first MOS switch and the second MOS switch according to the acquisition time point to obtain a first voltage signal; and
   adjusting negative excitation current in the hybrid flyback circuit according to a comparison result of the first voltage signal and a preset voltage value, so that the negative excitation current meets zero voltage switching of a primary-side switch of the hybrid flyback circuit.

2. The circuit control method according to claim 1, wherein determining an acquisition time point according to a turn-on alternating duration of a first MOS switch and a second MOS switch on a main side of the hybrid flyback circuit and a preset time coefficient comprises:
   obtaining dead time according to turn-off end time of the second MOS switch and turn-on start time of the first MOS switch; and
   determining the acquisition time point according to the preset time coefficient and the dead time.

3. The circuit control method according to claim 1, wherein adjusting negative excitation current according to a comparison result of the first voltage signal and a preset voltage value comprises:
   generating a second voltage signal through a feedback compensation network circuit according to the comparison result; and
   adjusting the negative excitation current by adjusting a turn-on duration of the second MOS switch according to the second voltage signal.

4. The circuit control method according to claim 3, wherein adjusting the negative excitation current by adjusting a turn-on duration of the second MOS switch according to the second voltage signal comprises:
   adjusting the turn-on duration of the second MOS switch according to the second voltage signal, and recording the turn-on duration of the second MOS switch to generate a third voltage signal; and
   turning off the second MOS switch according to a comparison result of the second voltage signal and the third voltage signal.

5. The circuit control method according to claim 4, wherein adjusting the turn-on duration of the second MOS switch according to the second voltage signal comprises:
   increasing the turn-on duration of the second MOS switch according to a preset rule, when the first voltage signal is higher than the preset voltage value; and
   decreasing the turn-on duration of the second MOS switch according to the preset rule, when the first voltage signal is lower than the preset voltage value.

6. The circuit control method according to claim 1, wherein acquiring a midpoint voltage between the first MOS switch and the second MOS switch according to the acquisition time point to obtain a first voltage signal comprises:
   acquiring an equivalent voltage of the midpoint voltage between the first MOS switch and the second MOS switch through an auxiliary winding of a transformer of the hybrid flyback circuit according to the acquisition time point, to obtain the first voltage signal.

7. A circuit control apparatus applied to a hybrid flyback circuit, comprising:
   a calculation module configured to determine an acquisition time point according to a turn-on alternating duration of a first MOS switch and a second MOS switch on a main side of the hybrid flyback circuit and a preset time coefficient; and
   a feedback compensation network module configured to acquire a midpoint voltage between the first MOS switch and the second MOS switch according to the acquisition time point to obtain a first voltage signal, and adjust negative excitation current according to a comparison result of the first voltage signal and a preset voltage value, so that the negative excitation current meets zero voltage switching of a primary-side switch of the hybrid flyback circuit.

8. The circuit control apparatus according to claim 7, wherein the feedback compensation network module comprises:
   a sampling unit configured to acquire the midpoint voltage between the first MOS switch and the second MOS switch according to the acquisition time point to obtain the first voltage signal;
   a feedback compensation unit configured to generate a second voltage signal according to the comparison result of the voltage signal and the preset voltage value; and an adjustment unit configured to adjust a turn-on duration of the second MOS switch according to the second voltage signal.

9. The circuit control apparatus according to claim 8, wherein the adjustment unit comprises:
a turn-on timer configured to record the turn-on duration of the second MOS switch to generate a third voltage signal; and
a comparator configured to turn off the second MOS switch according to a comparison result of the second voltage signal and the third voltage signal.

10. The circuit control apparatus according to claim 8, wherein the sampling unit is configured to acquire an equivalent voltage of the midpoint voltage between the first MOS switch and the second MOS switch through an auxiliary winding of a transformer of the hybrid flyback circuit to obtain the first voltage signal.

\* \* \* \* \*